Aug. 18, 1964   G. L. THAYER, JR., ETAL   3,145,327
SOLENOID MAGNETIC DAMPER
Filed April 6, 1962

United States Patent Office 3,145,327
Patented Aug. 18, 1964

3,145,327
SOLENOID MAGNETIC DAMPER
George Leo Thayer, Jr., Santa Ana, Calif., and John C. Hewitt, Jr., deceased, late of Long Beach, Calif., by Dorothy V. Hewitt and Patricia A. Morrison, administratrices, Long Beach, Calif., assignors to Robertshaw Controls Company, Richmond, Va., a corporation of Delaware
Filed Apr. 6, 1962, Ser. No. 185,733
11 Claims. (Cl. 317—185)

This invention relates to electromagnets and is particularly concerned with solenoids adapted to operate valves and analogous devices.

Quietness of operation in solenoids is an attainment which is problematic requiring means directed specifically to this end. The proclivity for noisy operation is due to operating forces which produce armature chatter or vibration, particularly the pulsating effects of alternating current during energization of a solenoid coil. Conventional means of damping this vibration may include spring bias devices which exert a laterally directed force on the armature, but which also create a constant frictional force having the effect of counteracting the operational force of the armature stroke during all phases of solenoid operation. This is undesirable because during the return stroke of the armature when the coil is not energized the pulsating effects of the alternating current do not exist and the frictional restriction only serves to impede armature motion.

Accordingly, it is an object of the present invention to dampen the armature action of a solenoid when the solenoid coil is energized and which releases said action when the coil is deenergized.

Another object of this invention is to utilize the magnetic field of a solenoid coil to produce armature damping action.

A further object of the invention resides in the provision of means obviating the noise-producing effects of pulsating alternating current flowing in a solenoid coil, without impairing operational armature motion during the deenergized portion of the coil cycle.

A still further object of this invention is to minimize frictional impediment of the armature stroke of a solenoid during performance of the damping action.

Briefly, the present invention may be described as comprising means made of ferromagnetic material, loosely mounted proximate a solenoid armature, which are magnetically drawn into engagement with said armature to exert a damping force thereon.

Other objects and many of the attendant advantages of this invention will become apparent from the following detailed description of three preferred embodiments thereof as illustrated in the accompanying drawing in which like reference numerals designate like parts throughout the figures thereof and wherein.

Figure 1:
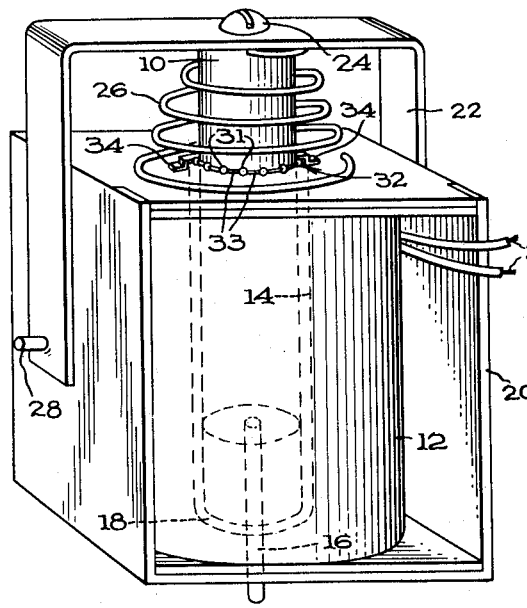
FIG. 1 is an isometric view of a solenoid equipped with an embodiment of the present invention.

Referring now to the drawing, and particularly to FIG. 1, there is shown an armature 10 mounted for slidable movement within a solenoid coil 12 with a core liner 14, positioned concentrically with the axis of the coil 12, encircling the armature 10 and forming a guideway therefor.

A rod 16 affixed to the lower end of armature 10 is adapted for connection to a dashpot delaying mechanism (not shown) which may be utilized to impart a delaying action at an intermediate point in the armature stroke before the armature 10 reaches the stop 18, which is positioned at the lowermost end of the armature guideway provided by the core liner 14.

An enclosing frame 20 formed of ferromagnetic material supports the coil and armature assembly and provides a circular opening in the top section thereof through which the armature 10 extends. The upper end of armature 10 has a U-shaped valve operating bracket 22 affixed thereto by a screw 24, and is encircled by a conical return spring 26 compressively engaged between the top section of frame 20 and the bracket 22.

Adaption of the solenoid assembly to control a valve or analogous mechanisms may be effected by connecting the rod 28, which is affixed to and movable with the bracket 22, to a valve stem (not shown) or other control instrumentality. Consequently, when the coil 12 is energized by connection of an alternating current source to the leads 30, the magnetic flux created will drive the armature 10 downwardly with the bracket 22 moving therewith against the action of the spring 26 until the stop 18 is reached. Subsequent deenergization of the coil 12 effects return of the armature 10 to its initial position through operation of the compressed spring 26, thereby imparting the desired control motion to the bracket 22 and the rod 28.

In the downward or coil-energized portion of the armature stroke, lateral armature vibration or chatter is damped by provision of a ball chain 32 made of ferromagnetic material and comprising a plurality of balls 31 interconnected by suitable links 33, loosely mounted about the armature 10 and held in place by step-shaped brackets 34 which are rigidly attached to the top section of frame 20 and spaced from the armature 10 to avoid impeding the armature stroke.

The ball chain 32 is magnetically drawn to the armature 10 when the coil 12 is energized thereby forcing the balls into the circular space between the armature 10 and the concentric opening in the top section of the frame 20. With the balls clamped in simultaneous contact with the armature 10 and the top section of frame 20, a force is exerted upon the armature 10 tending to counteract lateral motion thereof to damp noise-producing chatter or vibration. This clamping action is maintained during the coil-energized portion of the armature stroke.

Not all of the balls 31 on ball chain 32 are necessarily in contact at any given time, and the frictional forces impeding the axially directed motion of the armature 10 are minimized since essentially a point contact is made with the armature.

Deenergization of coil 12 terminates the magnetic force on ball chain 32 thereby releasing the damping action and allowing the spring 26 to return the armature 10 to its uppermost position without frictional restriction from the damping means.

Figure 2:
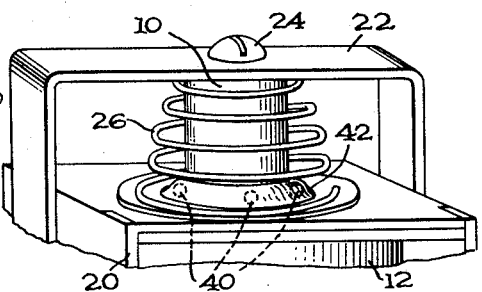
FIG. 2 is an isometric view, partly broken away, of the solenoid of FIG. 1 utilizing a second embodiment of the invention.

In a second form of the invention, illustrated in FIG. 2, the damping means comprise a plurality of ferromagnetic balls 40 freely retained about the armature 10 by a circular retaining cup 42 mounted upon the top section of frame 20 concentric with the armature 10. Sufficient spacing is provided between armature 10 and cup 42 to avoid restricting axial motion of the armature 10. This form of the invention operates similarly to the form shown in FIG. 1, with structural differences arising mainly in the damping means. Energization of coil 12 draws the balls 40 to armature 10 effecting the damping action in the manner previously described, with cup 42 supporting the balls 40 in a position proximate the armature 10 during the coil-deenergizing condition. Any appropriate number of balls 40 may be used, three balls having worked satisfactorily in tested samples of the invention.

Figure 4:
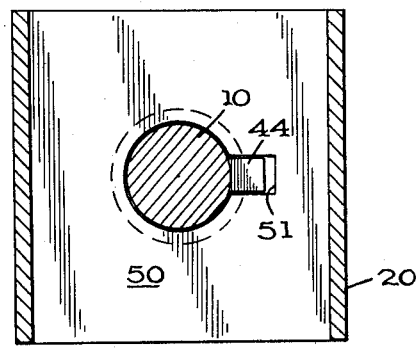
FIG. 4 is a cross sectional view taken along the line 4—4 of FIG. 3.
Figure 3:
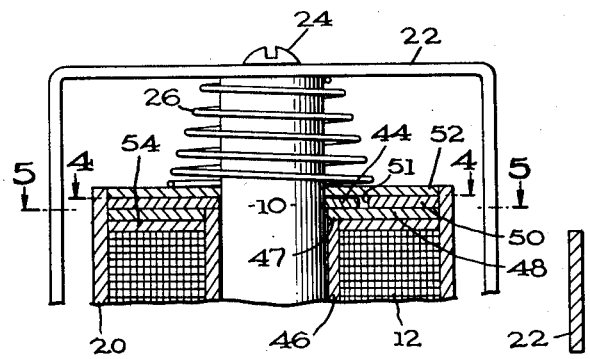
FIG. 3 is a sectional elevation of the solenoid utilizing a third embodiment of the invention.
Figure 5:
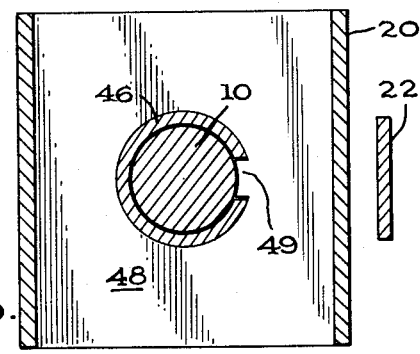
FIG. 5 is a cross sectional view taken along the line 5—5 of FIG. 3.

A third form of the invention, wherein the function and arrangement of armature 10, coil 12, bracket 22 and spring 26 are the same as described in FIG. 1, is illustrated in FIGS. 3, 4 and 5 and provides a rectangular slug 44 of ferromagnetic material slidably mounted aside the armature 10 within the top section of the frame 20. A plate 50, having a pressed-out rectangular recess 51 of larger dimensions with respect to width, length and thickness than the slug 44, is positioned concentric with armature 10. A section 47 of the core liner 46 is cut away to match recess 51; a plate 48 of ferromagnetic material, having a protruding section 49 shaped to replace the cut away section of liner 46, is mounted below the plate 50. An insulator end plate 54, having a circular centrally-disposed opening to accommodate the core liner 46, is mounted below plate 48; a cover plate 52, having a circular centrally-disposed opening through which armature 10 extends, is mounted above the plate 50 and is held in place by the force of return spring 26.

The ferromagnetic slug 44 is held in place between the plates 48 and 52, and is free to move within the recess 51. Upon energization of the coil 12, the slug 44 is magnetically attracted to and firmly forced against armature 10 and plate 48. The force thereby exerted upon the armature 10 effects damping of lateral armature vibration or chattering only during the coil-energized portion of the solenoid operation in much the same manner as set forth in the description of FIGS. 1 and 2, with the armature return stroke being freed from frictional impediment by deenergization of coil 12.

It will be apparent that the three forms of the invention herein described set forth the means by which armature damping may be simply and conveniently effected to automatically overcome the cause of armature vibration only when the cause exists, with attendant reduction and elimination of frictional forces impeding the operational aspects of the solenoid.

The inventive principles which are the essence of the present invention are employed in all three of the disclosed mechanisms, and it will be apparent that other forms may be contrived which are within the teachings of the present disclosure. Consequently, it should be understood that the foregoing disclosure relates to only preferred embodiments of the invention and inasmuch as such embodiments are subject to many changes and modifications, it is intended that the foregoing description of the drawing be interpreted as illustrative and not in a limiting sense.

What is claimed is:

1. In a solenoid including an electrical coil and an armature mounted within said coil magnetically driven by energization of said coil, the combination comprising means magnetically drawn into engagement with said armature and damping vibration therein during energization of said coil.

2. In a solenoid including an electrical coil and an armature mounted within said coil magnetically driven by energization of said coil, the combination comprising means made of ferromagnetic material loosely mounted proximate said armature and damping vibration therein during energization of said coil.

3. In a solenoid including an electrical coil and an armature mounted within said coil magnetically driven by energization of said coil, the combination comprising means loosely mounted proximate said armature and being magnetically drawn into engagement therewith during energization of said coil for damping vibration in said armature.

4. In a solenoid including an electrical coil and an armature mounted within said coil magnetically driven by energization of said coil, the combination comprising means fixedly mounted proximate said armature, and means loosely mounted proximate said armature magnetically drawn into engagement with said armature and said fixedly mounted means for damping vibration in said armature.

5. The combination of claim 4 wherein said loosely mounted means comprise a ball chain encircling said armature.

6. The combination of claim 4 wherein said loosely mounted means comprise a plurality of ball elements retained proximate said armature by a cup mounted to encircle said armature.

7. The combination of claim 4 wherein said loosely mounted means comprise a flat slug retained proximate said armature within a recess defined by means including at least said fixedly mounted means.

8. A solenoid comprising an electrical coil, an armature mounted within said coil magnetically driven by energization of said coil, a frame supporting said coil, means on said frame formed of ferromagnetic material defining an opening through which said armature extends, and means loosely mounted proximate said opening and being magnetically drawn into engagement with said armature and said ferromagnetic means for damping vibration of said armature.

9. The combination of claim 8 wherein said loosely mounted means comprise a ball chain encircling said armature held proximate said opening by bracket means mounted on said frame.

10. The combination of claim 8 wherein said loosely mounted means comprise a plurality of balls and including a cup mounted on said frame encircling said armature retaining said balls proximate said opening.

11. The combination of claim 8 wherein said loosely mounted means comprise a flat slug and including a recess contiguous with said opening, defined by means including at least said ferromagnetic means, retaining said slug.

References Cited in the file of this patent
UNITED STATES PATENTS
2,493,386    Cairns  --------------- Jan. 3, 1950